United States Patent
Jung

(10) Patent No.: US 7,679,115 B2
(45) Date of Patent: Mar. 16, 2010

(54) IMAGE SENSOR AND CONTROLLING METHOD THEREOF

(75) Inventor: Hun-Joon Jung, Seoul (KR)

(73) Assignees: Mtekvisions Co., Ltd., Seoul (KR); Clairpixel Co., Ltd., Seoul (KR)

(*) Notice: Subject to any disclaimer, the term of this patent is extended or adjusted under 35 U.S.C. 154(b) by 0 days.

(21) Appl. No.: 12/161,383

(22) PCT Filed: Jan. 19, 2007

(86) PCT No.: PCT/KR2007/000337

§ 371 (c)(1),
(2), (4) Date: Jul. 18, 2008

(87) PCT Pub. No.: WO2007/083951

PCT Pub. Date: Jul. 26, 2007

(65) Prior Publication Data

US 2009/0008685 A1    Jan. 8, 2009

(30) Foreign Application Priority Data

Jan. 19, 2006  (KR)  .................... 10-2006-0005714

(51) Int. Cl.
| | | |
|---|---|---|
| H01L 27/146 | (2006.01) | |
| H01L 31/103 | (2006.01) | |
| H01L 31/105 | (2006.01) | |
| H04N 3/15 | (2006.01) | |
| H04N 3/28 | (2006.01) | |
| H04N 5/335 | (2006.01) | |

(52) U.S. Cl. .............................. 257/292; 257/E27.133; 348/296; 348/297; 348/308; 250/208.1

(58) Field of Classification Search .................. 257/292, 257/E27.133; 348/296, 297, 308; 250/208.1
See application file for complete search history.

(56) References Cited

U.S. PATENT DOCUMENTS

| 5,986,297 A | * | 11/1999 | Guidash et al. ............. 257/223 |
| 6,780,666 B1 |  | 8/2004 | McClure |
| 7,078,746 B2 |  | 7/2006 | Hong |
| 7,115,923 B2 |  | 10/2006 | Hong |
| 7,242,043 B2 | * | 7/2007 | Ohkawa ...................... 257/292 |
| 7,489,352 B2 | * | 2/2009 | Nakamura .................. 348/296 |
| 2005/0205902 A1 |  | 9/2005 | Hara et al. |

(Continued)

FOREIGN PATENT DOCUMENTS

JP    2000-92396 A    3/2000

*Primary Examiner*—Evan Pert
(74) *Attorney, Agent, or Firm*—Birch, Stewart, Kolasch & Birch, LLP

(57) ABSTRACT

A controlling method of an image sensor is disclosed. The method includes: measuring a first output voltage of a drive transistor, a gate of which is combined to a floating diffusion region, after a predetermined integration time; resetting the floating diffusion region by turning on a reset transistor connected between the floating diffusion region and a power supply group; measuring a reference voltage outputted from the drive transistor; transferring electric charges generated in a photo diode by sensing light inputted from the outside to the floating diffusion region by turning on a transfer transistor connected to the photo diode; and measuring a second output voltage of the drive transistor; wherein an image is generated by using a voltage difference between the first output voltage and the reference voltage, and a voltage difference between the second output voltage and the reference voltage.

8 Claims, 8 Drawing Sheets

U.S. PATENT DOCUMENTS

2006/0261431 A1* 11/2006 Kim et al. .................. 257/462
2007/0252184 A1* 11/2007 Ohkawa .................... 257/292
2009/0008685 A1* 1/2009 Jung ......................... 257/292

* cited by examiner

Conventional Art

Conventional Art

IMAGE SENSOR AND CONTROLLING METHOD THEREOF

CROSS-REFERENCE TO RELATED APPLICATIONS

This application claims foreign priority benefits under 35 U.S.C. sctn. 119(a)-(d) to PCT/KR20071000337, filed Jan. 19, 2007, which is hereby incorporated by reference in its entirety.

BACKGROUND

1. Technical Field

The present invention relates to an image sensor, more particularly to a CMOS image sensor and a controlling method thereof.

2. Description of the Related Art

An image sensor refers to a semiconductor device converting an optical image to an electric signal. The image sensor includes a charge coupled device (CCD) and a complementary metal-oxide-semiconductor (CMOS) image sensor. The CCD is composed of an integrated circuit containing metal-oxide-semiconductor (MOS) capacitors disposed adjacent to each other, and each capacitor can transfer its electric charge to a neighboring capacitor. The CMOS image sensor is formed by using a CMOS technology, which employs a control circuit and a signal processing circuit as peripheral circuits, is composed of as many MOS transistors as the number of pixels, and detects an output from each MOS transistor one by one.

FIG. 1 is a sectional view of a pair of pixels having different sizes in a conventional image sensor. As shown in FIG. 1, a conventional CCD expands a dynamic range by using a large pixel 110 and a small pixel 120.

It takes the small pixel 120 four times as much time as the large pixel 110 to be saturated with inputted light of the same intensity. Accordingly, with a pair of pixels generating different outputs, the dynamic range can be expanded. Here, the dynamic range refers to a range within which a maximum output of the image sensor can change, and the wider the dynamic range becomes, the more realistically an object can be represented.

FIGS. 2a and 2b illustrate images generated by applying different output voltages, and FIG. 2c illustrates a composite image of the images in FIGS. 2a and 2b. A composite image can be created by combining a short exposure image and a long exposure image.

The brightness of the composite image can be controlled by regulating the ratio of the output voltage required for producing the short exposure image to the output voltage required for producing the long exposure image. Therefore, the brightness of the composite image can be set between the brightness of the short exposure image and that of the long exposure image.

However, a minute difference in manufacturing process creates a fixed pattern noise associated with an offset voltage in the image sensor. In order to compensate such a fixed pattern noise, the image sensor reads a reset voltage signal and a data voltage signal from each pixel in a pixel array, and then outputs the difference between the two voltage signals. This method is called a correlated double sampling (CDS).

Here, the CCD has disadvantages in that the CCD has a complex operating process, consumes a large volume of power, requires a number of mask process steps, and is manufactured as a multi-chip device because a signal processing circuit can not be implemented in the CCD chip. In order to overcome these disadvantages, a CMOS image sensor, which uses sub-micron CMOS manufacturing technology, has been developed. The CMOS image sensor detects signals by a switching method from a photo diode and a MOS transistor formed in a unit pixel to create an image. Since the CMOS image sensor is manufactured by CMOS manufacturing technology, it consumes less-power and requires fewer masks than the CCD, and can be integrated in one chip with other signal processing circuits. Therefore, the CMOS image sensor is emerging as an alternative to the CCD.

Also, in the case of pairing a large pixel with a small pixel, photo diodes should also be formed to have different sizes, complicating the manufacturing process.

And, in the case of pairing a large pixel with a small pixel, each pixel needs its own transistor, increasing the overall size of the image sensor.

Moreover, in order to obtain a wide dynamic range, the conventional CCD image sensor stores data on the short exposure image and the long exposure image in separate frame memories and then conducts an operation, thereby requiring a large volume of memory.

SUMMARY

The present invention provides an image sensor and a controlling method thereof that use electric charges generated in a floating diffusion region to obtain a wide dynamic range.

Also, the present invention provides an image sensor and a controlling method thereof that require no separate light-receiving element in order to have a wide dynamic range.

Also, the present invention provides an image sensor and a controlling method thereof that require no additional manufacturing process to obtain a wide dynamic range.

Also, the present invention provides an image sensor and a controlling method thereof that can perform a data operation and a data processing in real time, since image data is stored in the same frame memory regardless of exposure time.

Other objects of the present invention will become more easily understandable through the embodiments described below.

An aspect of the present invention features a controlling method of an image sensor. The method can comprise: measuring a first output voltage of a drive transistor, a gate of which is combined to a floating diffusion region, after a predetermined integration time; resetting the floating diffusion region by turning on a reset transistor connected between the floating diffusion region and a power supply group; measuring a reference voltage outputted from the drive transistor; transferring electric charges generated in a photo diode by sensing light inputted from the outside to the floating diffusion region by turning on a transfer transistor connected to the photo diode; and measuring a second output voltage of the drive transistor; wherein an image is generated by using a voltage difference between the first output voltage and the reference voltage, and a voltage difference between the second output voltage and the reference voltage.

The method can further comprise combining a first image generated by using the first output voltage and a second image generated by using the second output voltage.

Another aspect of the present invention features an image sensor. The image sensor can comprise: a photo diode that senses light inputted from the outside and generates electric charges in correspondence thereto; a transfer transistor that is combined to the photo diode and transfers the electric charges generated in the photo diode; a floating diffusion region that receives and stores the electric charges generated in the photo diode, and produces and stores electric charges by sensing light inputted from the outside; a reset transistor that is connected between the floating diffusion region and a power supply group and resets the voltage in the floating diffusion region; a drive transistor detecting an electric signal from the floating diffusion region, wherein a source group of the drive transistor is connected to the power supply group and a gate of the drive transistor is combined with the floating diffusion region; and a select transistor that is connected to the drive transistor, and outputs an output signal of a unit pixel.

The area of the floating diffusion region can be larger than that of the photo diode.

The floating diffusion region can be formed by a P-N junction.

The depth of the P-N junction formed in the photo diode can be greater than that of the P-N junction formed in the floating diffusion region.

The floating diffusion region is doped more heavily than the photo diode.

A part of the floating diffusion region is blocked from light by a light block film.

DETAILED DESCRIPTION

Hereinafter, embodiments of the present invention will be described in detail with reference to the accompanying drawings.

The descriptions set forth below merely illustrate the principles of the present invention. Therefore, those skilled in the art could devise various methods and apparatus thereof which realize the principles of the present invention and which do not depart from the spirit and scope of the present invention, even though they may not be explicitly described in the present specification. Also, it is to be appreciated that not only the principles, viewpoints, and embodiments of the present invention, but all detailed descriptions listing the particular embodiments are intended to include structural and functional equivalents.

Terms used in the description (for example, a first, a second, etc.) are merely used to distinguish equal or similar items in an ordinal manner.

Also, the terms used in the description are merely used to describe the following embodiments, but not to limit the invention. Unless clearly used otherwise, expressions in the singular number include a plural meaning. In this application, the terms "included" and "stored" intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the invention pertains. The terms used herein shall not be interpreted not only based on the definition of any dictionary but also the meaning that is used in the field to which the invention pertains. Also, unless clearly defined, the terms used herein shall not be interpreted too ideally or formally.

Before describing embodiments of the present invention, the structure and the operating principle of a complimentary metal-oxide-silicon (CMOS) image sensor is first described.

Figure 1:
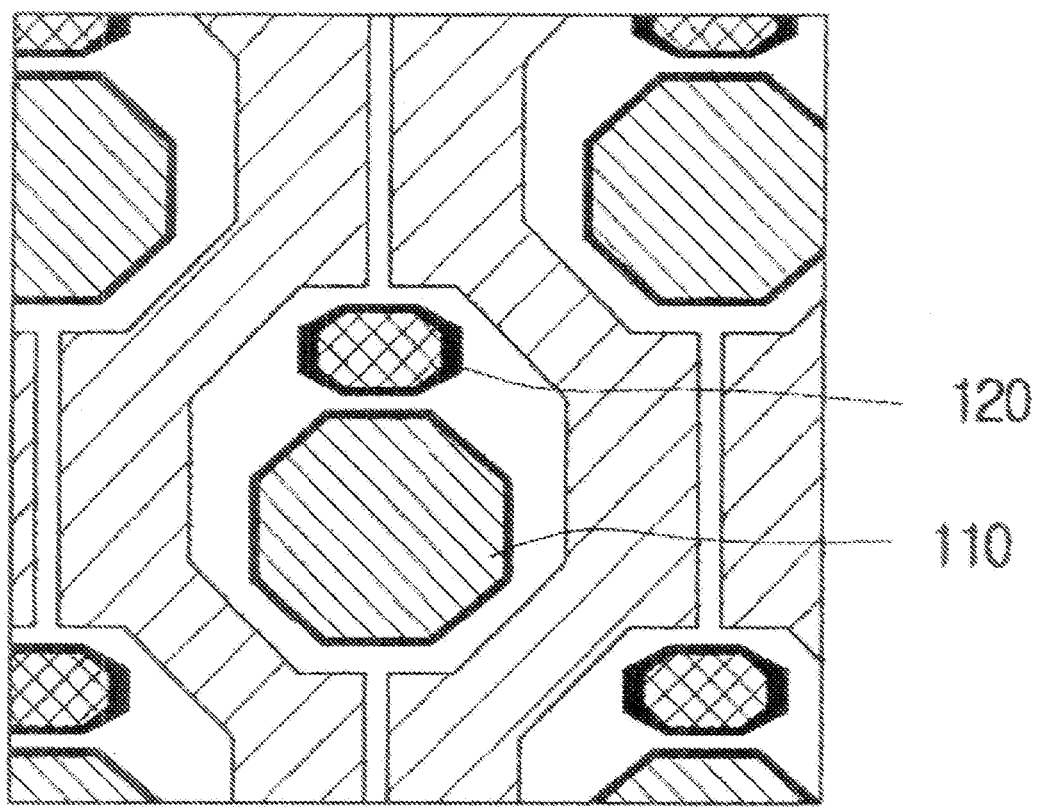
FIG. 1 illustrates a pair of pixels having different sizes in a conventional image sensor.
Figure 2:
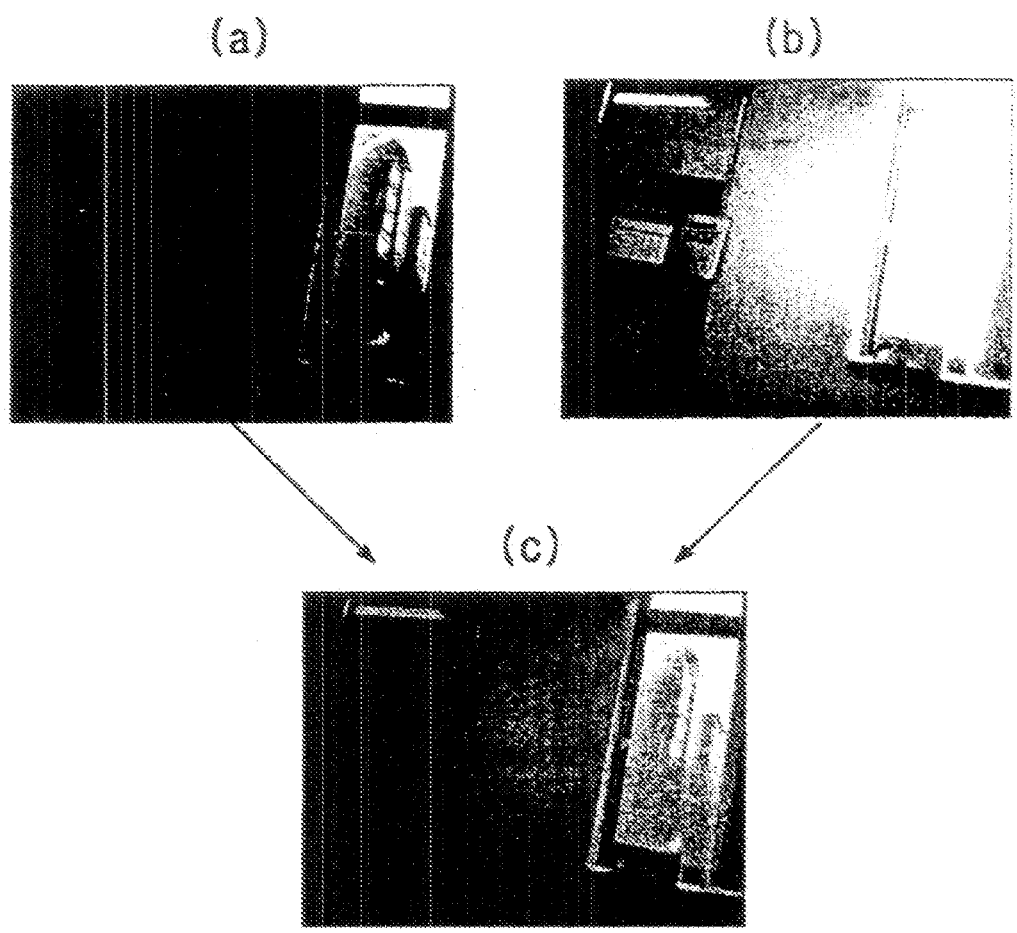
FIGS. 2a and 2b shows two images generated by applying different output voltages.
FIG. 2c shows a composite image of the two images that can represent a wide dynamic range.
Figure 3:
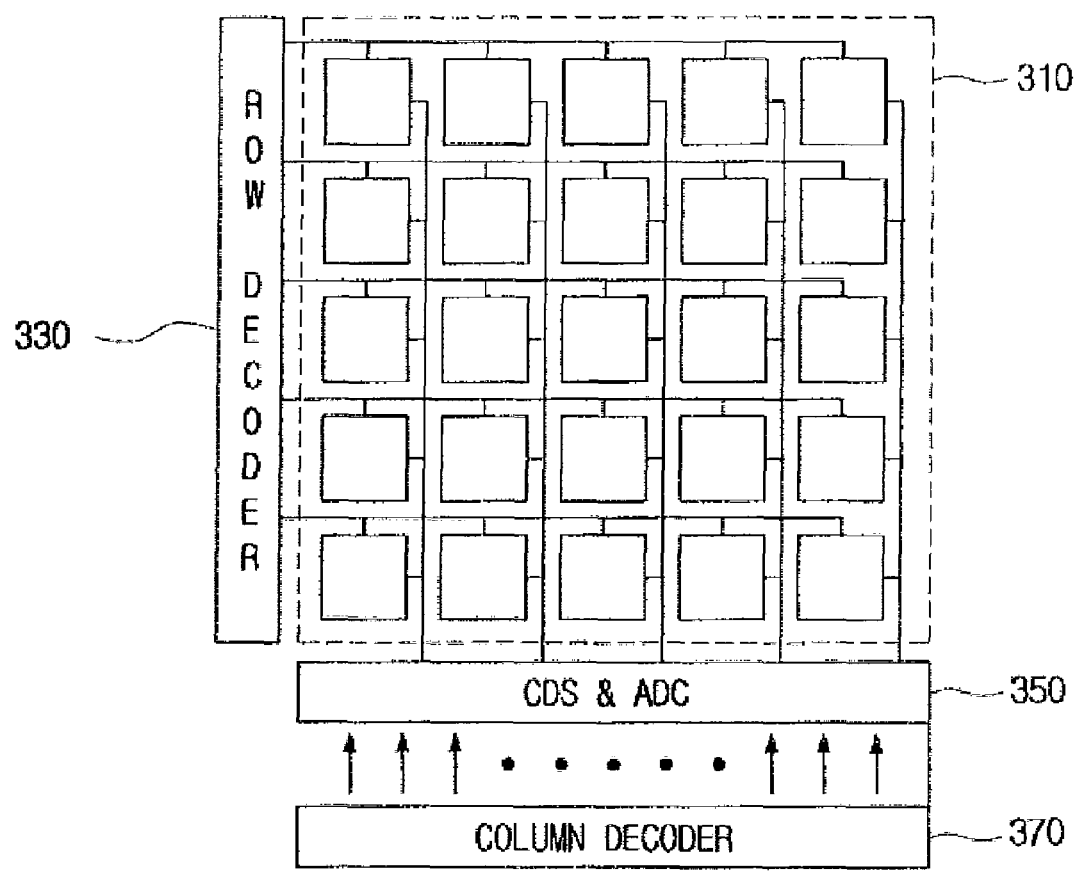
FIG. 3 is a block diagram of a CMOS image sensor employing a scanning method.

FIG. 3 is a block diagram of a CMOS image sensor employing a scanning method. Referring to FIG. 3, the CMOS image sensor includes a pixel array 310, a row decoder 330, a correlated double sampling and analog digital converter (CDS & ADC) 350, and a column decoder 370.

Figure 4:
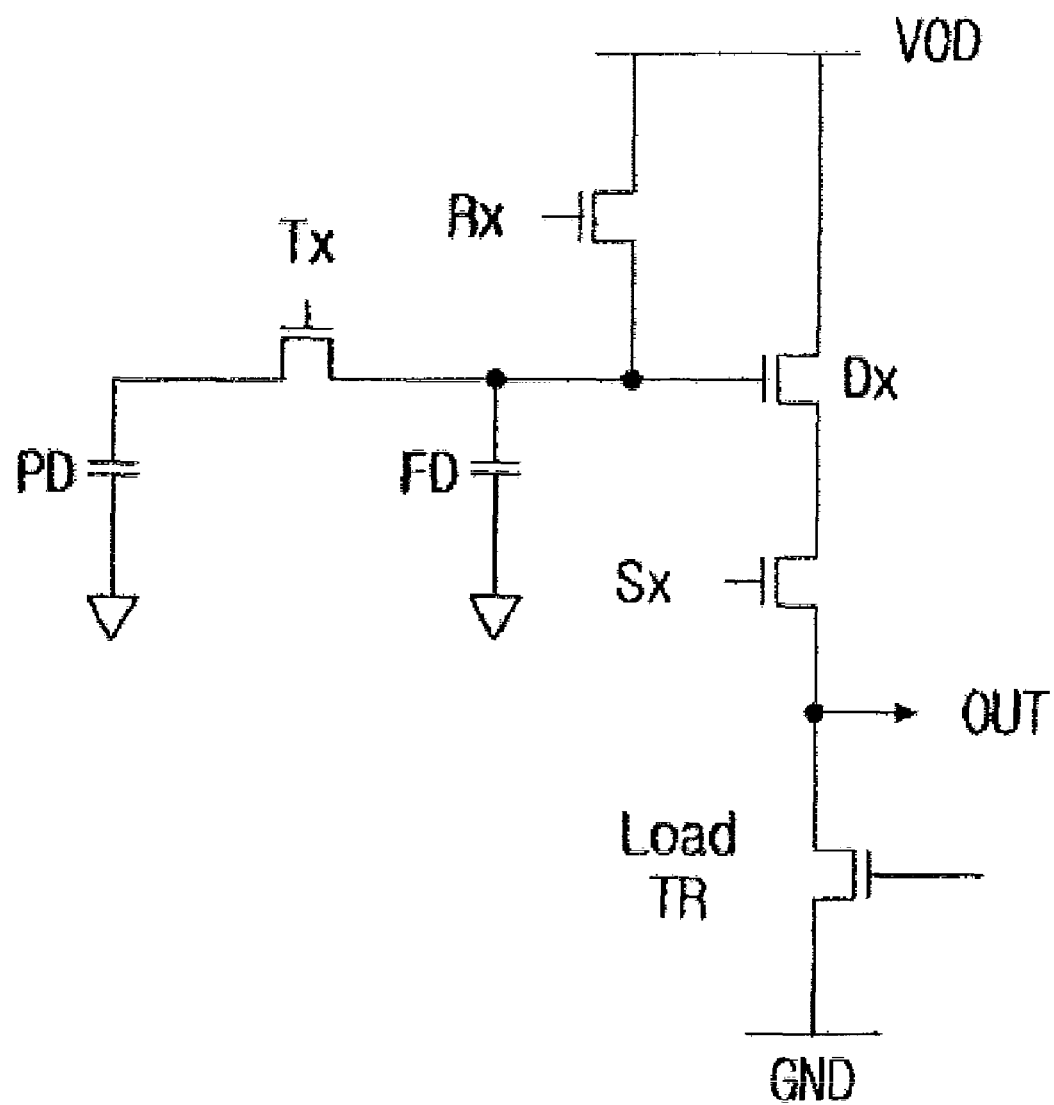
FIG. 4 is a circuit diagram of a unit pixel of a CMOS image sensor having 4-T (4-Transistor) structure.

Unit pixels as shown in FIG. 4 are arrayed in the pixel array 310, and the row decoder 330, which appoints a row address, is positioned in one side of the pixel array 310. The column decoder 370, which appoints a column address for a pixel, and the CDS & ADC, which receives pixel data, are disposed perpendicular to the row decoder 330. The row decoder 330 is composed of a plurality of row decoder cells. Each row decoder cell is composed of a plurality of gates and receives an input signal through an address signal line, a transfer signal line, a select signal line and a reset signal line.

And an output signal is outputted through a reset gate signal output unit, which outputs a reset gate signal generated in accordance with an address signal and a reset signal that are inputted through the address signal line and the reset signal line, respectively, a select gate signal output unit, which outputs a select gate signal generated in accordance with the address signal and a select signal that are inputted through the address signal line and the select signal line, respectively, or a transfer signal output line, which outputs a transfer signal inputted through the transfer signal line.

The row decoder 330 selects a pixel row, and then the column decoder 370 extracts data from each pixel in the selected row. Subsequently, the extracted data is later amplified. In the same manner, data is extracted from all the pixels of the pixel array.

The CDS & ADC converts the extracted pixel data, which is analog data, to digital data, and performs sampling, thereby producing a high quality image.

Figure 5:
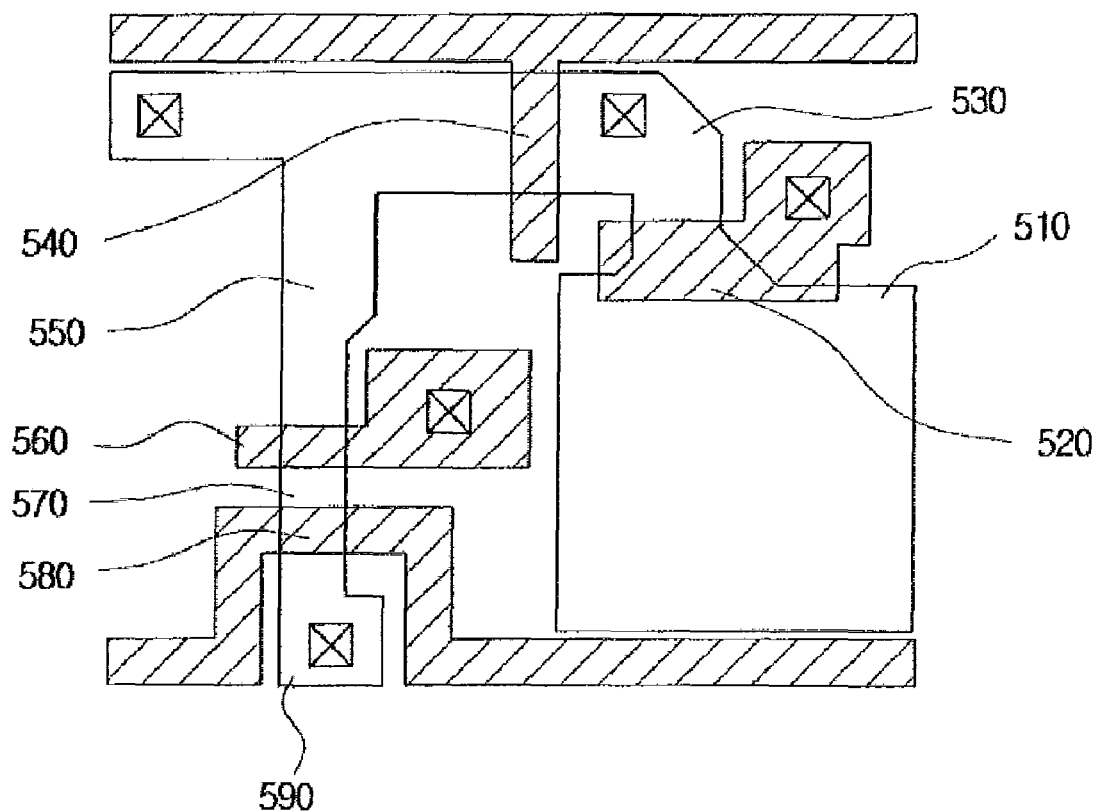
FIG. 5 shows a layout of a unit pixel of a CMOS image sensor having 4-T structure.
Figure 6:
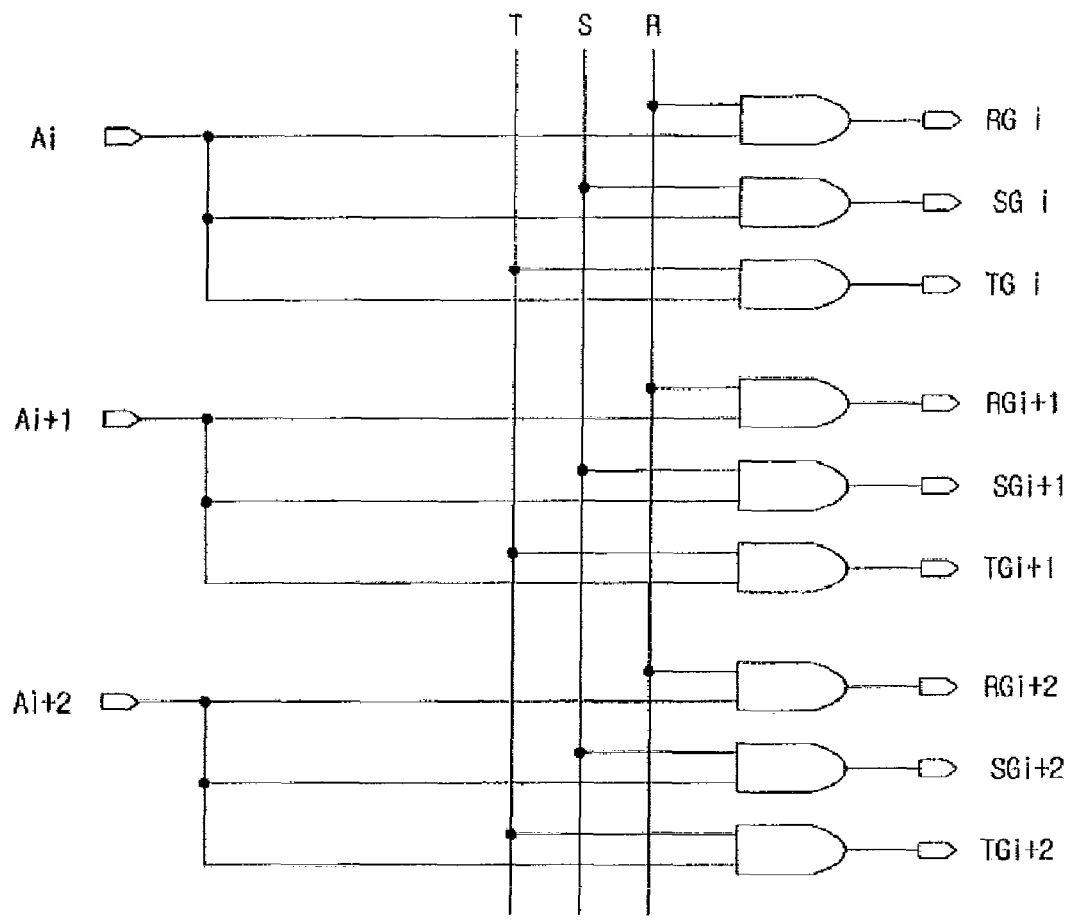
FIG. 6 shows a circuit diagram of a row decoder.

FIG. 4 is a circuit diagram of a unit pixel of a CMOS image sensor having 4-T structure. FIG. 5 is a layout of the unit pixel shown in FIG. 4, and FIG. 6 is a typical circuit diagram of a row decoder. Referring to FIG. 4, the unit pixel includes a photo diode (PD), a reset transistor (Rx), a transfer transistor (Tx), a drive transistor (Dx), and a select transistor (Sx). The PD performs photoelectric conversion, the Rx resets the PD according to the reset gate signal, the Tx transfers electrons accumulated in the PD to a floating diffusion region in response to the transfer signal, the Dx changes a source-follower circuit current according to a voltage change in the floating diffusion region, thereby changing an output voltage of the unit pixel, and the Sx outputs the output voltage of the unit pixel, which is generated due to the voltage change in the floating diffusion region, in accordance with the select gate signal.

A digital camera with the CMOS image sensor captures a subject by a rolling shutter method. The rolling shutter method exposes the pixels, arrayed in two-dimension, sequentially in units of row for a predetermined time, and then reads data from each row one by one.

FIG. 5 illustrates an isolation that defines an active region where the photo diode and the floating diffusion region are to be formed and a gate conduction layer that constitutes a gate of each transistor. Referring to FIG. 5, a photo diode 510 is formed in square, and a gate 520 of the transfer transistor is disposed such that one side of the gate 520 is in contact with one side of the photo diode 510.

The floating diffusion region 530 is disposed such that one end of the floating diffusion region 530 is in contact with the other side of the gate 520 of the transfer transistor, and bent such that the one end is perpendicular to the other end, and, therefore, the floating diffusion region 530 is in contact with one side of a gate 540 of the reset transistor. A drain region 550 is disposed such that one end of the drain region 550 is in contact with the other side of the gate 540 of the reset transistor, and bent such that the other end of the drain region 550 is perpendicular to the end, and is in contact with one side of a gate 560 of the drive transistor. A gate 580 of the select transistor is disposed parallel with the gate 560 of the drive transistor, forming a source region 570 between the other side of the gate 560 of the drive transistor and one side of the gate 580 of the select transistor, and another drain region 590 by the other side of the gate 580 of the select transistor.

In the unit pixel having a layout as described above, the floating diffusion region 530 is formed in the active region located between the gate 520 of the transfer transistor and the gate 540 of the reset transistor, and is electrically connected with the gate 560 of the drive transistor by a contact or a connecting wire.

The floating diffusion region 530 is usually smaller than the photo diode 510. Accordingly, it takes the floating diffusion region 530 less time than the photo diode 510 to be saturated with light. Therefore, by using electric charges generated in the photo diode 510 and the floating diffusion region 530 separately, a wide dynamic range can be achieved.

Here, the floating diffusion region 530 has a charge-storing architecture, and it can receive light from the outside to produce electric charges. That is, the floating diffusion region 530 can be formed by P-N junction like the photo diode 510, thereby functioning as a light receiving element.

Generally, the photo diode 510 uses a phenomenon that an electric current is created when the P-N junction is exposed to light under reverse bias. Here, the electric current changes in proportion to the amount of the light. A potential barrier generated in the P-N junction grows under the reverse bias, allowing no electric current to flow across the P-N junction. If the PN junction is exposed to light under this state, holes in the N region and electrons in the P region are activated thanks to the light energy. These holes and electrons flow, creating an electric current. Under constant voltage, the electric current flows in proportion to the amount of the light inputted into the element.

This photo diode 510 can be a hole accumulation diode (HAD) that has a P+ region formed in the surface of an end of a semiconductor substrate and an N region formed therebelow. Meanwhile, the floating diffusion region 530 has a P-N junction composed of an N+ region and a P-well formed therebelow, or of an N+ region and a P type substrate, thereby also being able to function as a light receiving element. In order to receive light from the outside, an upper surface of the floating diffusion region 530 is not shielded with a light shield material, but can be covered with a transparent material.

Here, the floating diffusion region 530 can enhance the efficiency in concentrating the light by regulating the doping density and the doping depth of the PN junction. The density and the depth of the floating diffusion region 530 can be different from that of the photo diode 510. When the area of the floating diffusion region 530 is different from that of the diode 510, photo sensitivity can be adjusted by controlling the doping density and the depth of the floating diffusion region 530.

The present invention can receive light by using the floating diffusion region 530 and the photo diode 510 having a typical doping density and a depth. Here, the floating diffusion region 530 can be doped more heavily than the photo diode 510.

And, a part of the floating diffusion region 530 can be covered with an opaque film (light shield film) in order to block the light from the outside, lowering the overall photo sensitivity. The opaque film can be a metallic film.

Referring to FIG. 6, row address signals ($A_i$, $A_{i+1}$, $A_{i+2}$), a transfer signal (T), a select signal (S), and a reset signal (R) are combined to produce a reset gate signal ($RG_i$), a transfer gate signal ($TG_i$), and a select gate signal ($SG_i$) for an ith row, a reset gate signal ($RG_{i+1}$), a transfer gate signal ($TG_{i+1}$), and a select gate signal ($SG_{i+1}$) for an (i+1)th row, and a reset gate signal ($RG_{i+2}$), a transfer gate signal ($TG_{i+2}$), and a select gate signal ($SG_{i+2}$) for an (i+2)th row.

Figure 7:
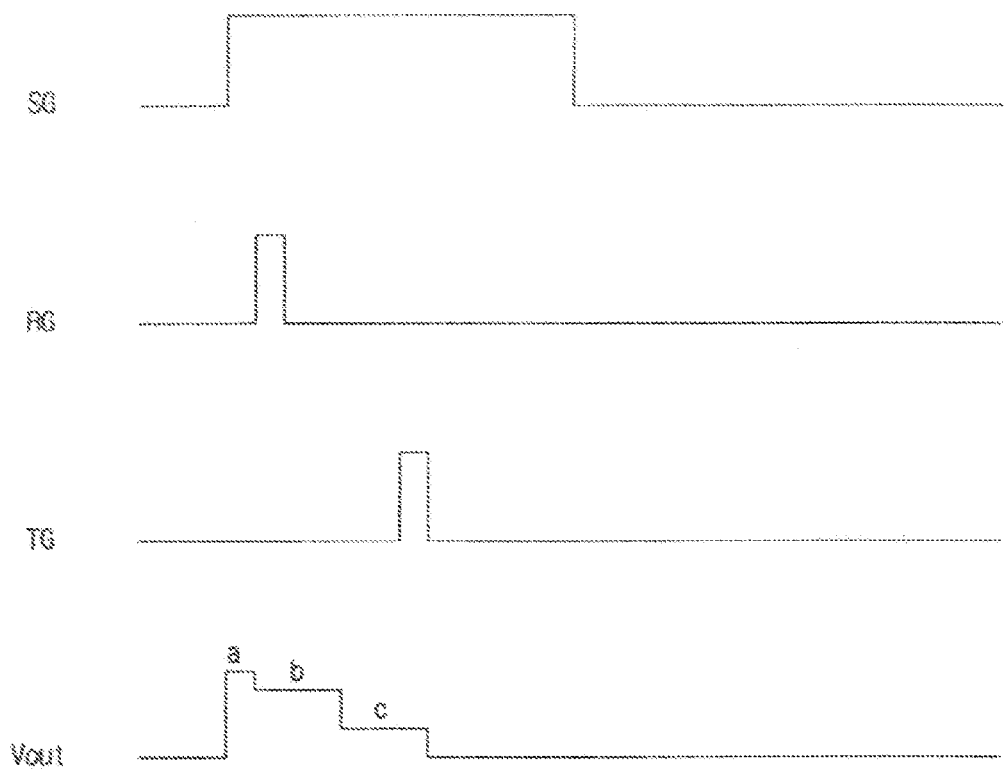
FIG. 7 shows an operation timing of a unit pixel according to the prior art.

FIG. 7 shows an operation timing of a unit pixel according to the prior art. When a row is selected in accordance with the select gate signal (SCO), the select transistor (Sx) is turned on, and the reset transistor (Rx) resets the voltage in the floating diffusion region in accordance with the reset gate signal (RG). Subsequently, lights inputted into the photo diode cause electrons to be generated. When the transfer gate signal (TG) turns on the transfer transistor (Tx), electric charges created in the photo diode due to the accumulated electrons are transferred to the floating diffusion region, and the drive transistor (Dx) changes the output voltage of the unit pixel in correspondence to the amount of the electric charges in the floating diffusion region.

Referring to FIG. 7, level a is an initial voltage level of an output node after a row is selected in accordance with the select gate signal (SG), level b is a voltage level of the output node after the floating diffusion region is reset in accordance with the reset gate signal (RG), and level c is a voltage level after the electrons are diffused in the floating diffusion region in accordance with the transfer gate signal. The difference between the voltage level b and the voltage level c is outputted as an actual image data signal.

Figure 8:
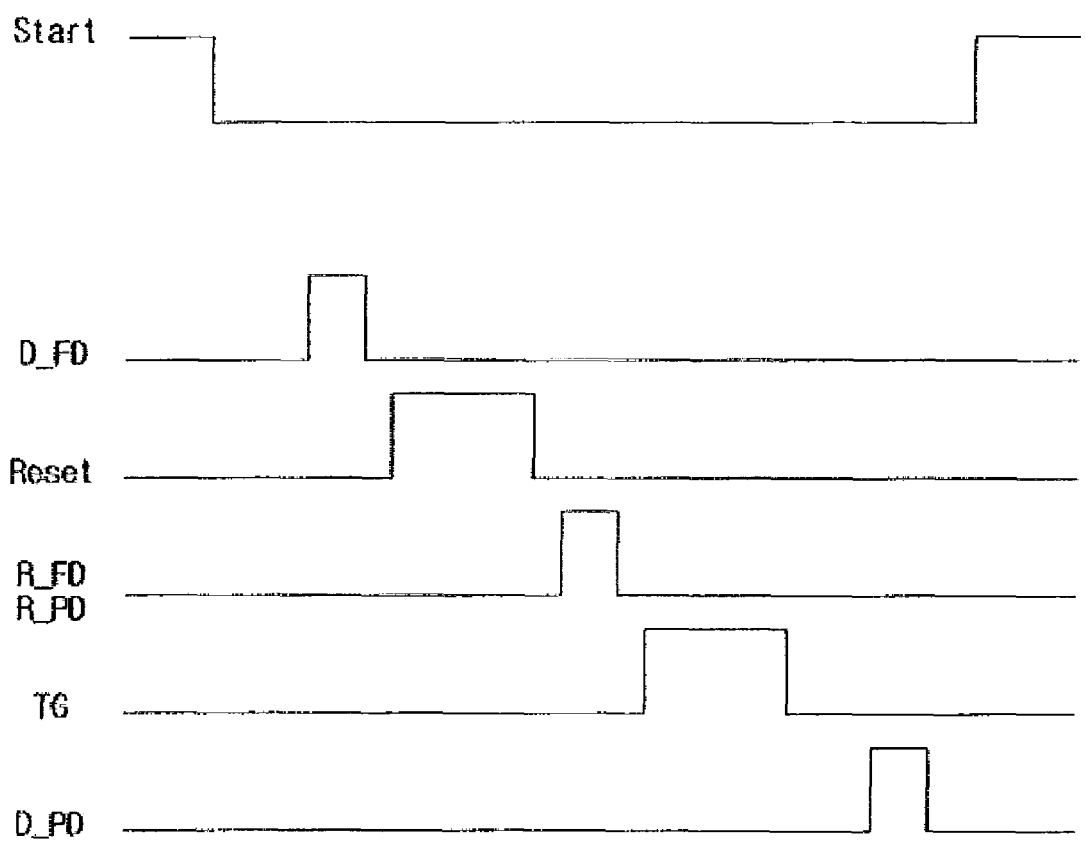
FIG. 8 shows an operation timing of a unit pixel according to an embodiment of the present invention.

FIG. 8 shows an operation timing of a unit pixel according to an embodiment of the present invention. In order to employ electric charges generated in a floating diffusion region as an image data signal, an image sensor can be operated as follows:

First, a transfer transistor (Tx) and a reset transistor (Rx) are turned on, resetting a photo diode (PD). Subsequently, the transfer transistor (Tx), the reset transistor (Rx) and a select transistor (Sx) are turned off. At this time, the photo diode (PD) is in a fully depleted state. Photo-generated charges are accumulated in the photo diode and the floating diffusion region. (referred to as 'Integration Process') The photo-generated charges are generated at the same time in the photo diode (PD) and the floating diffusion region (FD) that function as a light receiving element.

Afterwards, a target pixel is appointed by turning on the select transistor (Sx). First, the voltage generated due to the photo-generated charges collected in the floating diffusion region (FD) is measured. More specifically, after a predetermined integration time is measured a first output voltage of a drive transistor (Dx), a source group of which is connected to a power supply group and a gate of which is combined with the floating diffusion region.

Then, the reset transistor (Rx), which is connected between the floating diffusion region FD and the power supply group, is turned on, resetting the floating diffusion region FD.

The output voltage of the drive transistor (Dx), which is a source follower buffer, is measured. This value merely means a reference voltage, a DC level shift in the floating diffusion region (FD).

Then, an output voltage generated due to the photo-generated charges accumulated in the photo diode (PD) is measured. The transfer transistor (Tx) connected to the photo diode (PD) is turned on, whereby the photo-generated charges accumulated in the photo diode (PD) are transferred to the floating diffusion region (FD). After the photo-generated charges are transferred, the transfer transistor (Tx) is turned off, and then a second output voltage of the drive transistor (Dx) is measured.

Here, the reference voltage of the floating diffusion region (FD) can also be a reference voltage to the photo diode (PD). That is, the difference between the first output voltage and the reference voltage and the difference between the second output voltage and the reference voltage can be outputted as image data signals. These voltage differences are products of transferring the photo-generated charges separately accumulated in the photo diode (PD) and the floating diffusion region (FD), and are pure signal values in which no noise is included. Accordingly, an image having a desired brightness can be produced by using these voltage differences. That is, by combining a first image generated by the first output voltage and a second image generated by the second output voltage, a composite image having a desired brightness can be obtained. A separate image combining part can be disposed in order to generate the composite image.

The CMOS image sensor is operated by a correlated double sampling (CDS) method, which first measures a noise voltage V1, which is a noise measured on a voltage scale, and a combined voltage V2, which contains the noise and image information, and then subtracts the first voltage from the second voltage, thereby obtaining an output containing pure image data.

Therefore, according to the present invention, a wide dynamic range can be obtained since the image data is created by using the photo-generated charges accumulated not only in the photo diode but also in the floating diffusion region.

The image sensor and the controlling method thereof according to the present invention can provide a wide dynamic range by using the charge generated by the light inputted in the floating diffusion region.

Also, the image sensor and the controlling method thereof according to the present invention can provide a wide dynamic range without having an additional light receiving element.

Also, the image sensor and the controlling method thereof according to the present invention can be manufactured with no additional manufacturing process, since the image sensor having the floating diffusion region can provide a wide dynamic range.

Moreover, the image sensor and the controlling method thereof according to the present invention can conduct an operation and process in real-time since two image data exposed for different times are stored in the same frame memory.

The drawings and detailed description are only examples of the present invention, serve only for describing the present invention and by no means limit or restrict the spirit and scope of the present invention. Thus, any person of ordinary skill in the art shall understand that a large number of permutations and other equivalent embodiments are possible. The true scope of the present invention must be defined only by the spirit of the appended claims.

What is claimed is:

1. A controlling method of an image sensor, the method comprising:
    measuring a first output voltage of a drive transistor, a gate of which is combined with a floating diffusion region, after a predetermined integration time;
    resetting the floating diffusion region by turning on a reset transistor connected between the floating diffusion region and a power supply group;
    measuring a reference voltage outputted from the drive transistor;
    transferring electric charges in a photo diode generated due to light inputted from the outside, to the floating diffusion region by turning on a transfer transistor connected to the photo diode; and
    measuring a second output voltage of the drive transistor;
    whereas an image is generated by using a voltage difference between the first output voltage and the reference voltage, and a voltage difference between the second output voltage and the reference voltage.

2. The controlling method of the image sensor of claim 1 further comprising combining a first image generated by using the first output voltage and a second image generated by using the second output voltage.

3. An image sensor comprising:
    a photo diode that senses light inputted from the outside and generates electric charges;
    a transfer transistor that is combined with the photo diode and transfers the electric charges generated in the photo diode;
    a floating diffusion region that receives from the photo diode and stores the electric charges, and produces by sensing light inputted from the outside and stores electric charges;
    a reset transistor that is connected between the floating diffusion region and a power supply group and resets the voltage in the floating diffusion region;
    a drive transistor detecting an electric signal from the floating diffusion region, wherein a source group of the drive transistor is connected to the power supply group and a gate of the drive transistor is combined with the floating diffusion region; and
    a select transistor that is connected to the drive transistor, and outputs an output signal of a unit pixel.

4. The image sensor of claim 3, wherein the area of the floating diffusion region is larger than that of the photo diode.

5. The image sensor of claim 3, wherein the floating diffusion region is formed by a P-N junction.

6. The image sensor of claim 5, wherein the depth of the P-N junction formed in the photo diode is greater than that of the P-N junction formed in the floating diffusion region.

7. The image sensor of claim 5, wherein the floating diffusion region is more heavily doped than the photo diode.

8. The image sensor of claim 3, wherein a part of the floating diffusion region is shielded from light by a light shield film.

* * * * *